Nov. 29, 1960
A. J. GRANBERG
2,961,874
TEMPERATURE COMPENSATED LIQUID METER
Filed Oct. 22, 1957
2 Sheets-Sheet 1
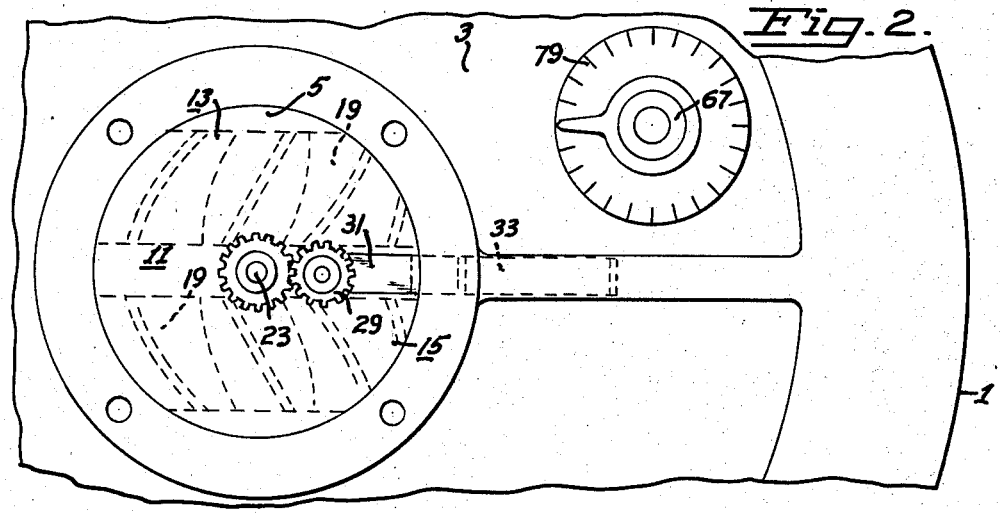
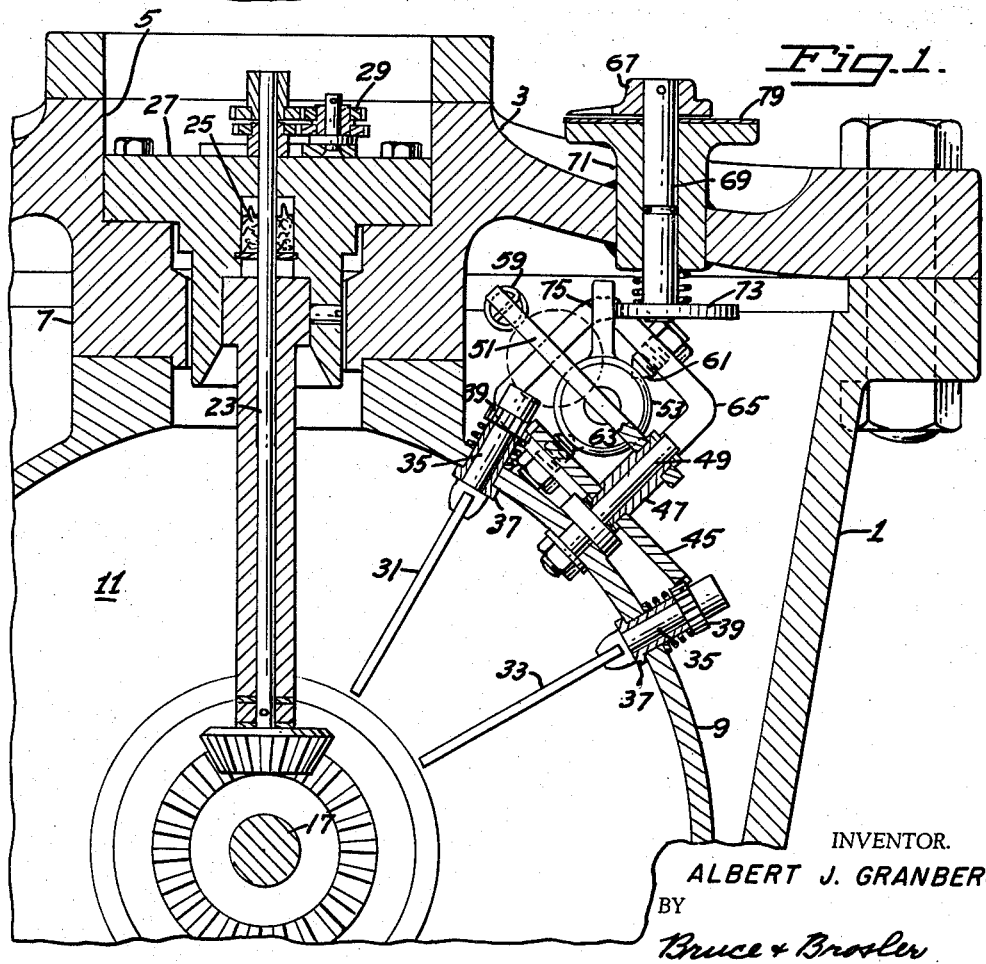
INVENTOR.
ALBERT J. GRANBERG
BY
HIS ATTORNEYS Nov. 29, 1960 A. J. GRANBERG 2,961,874
TEMPERATURE COMPENSATED LIQUID METER
Filed Oct. 22, 1957 2 Sheets-Sheet 2

INVENTOR.
ALBERT J. GRANBERG
BY
Bruce & Brosler
HIS ATTORNEYS

United States Patent Office 2,961,874
Patented Nov. 29, 1960

2,961,874

TEMPERATURE COMPENSATED LIQUID METER

Albert J. Granberg, 6001 Rockwell St., Oakland, Calif.

Filed Oct. 22, 1957, Ser. No. 691,758

4 Claims. (Cl. 73—230)

My invention relates to liquid meters and more particularly to the compensation of such meters for volume and viscosity changes due to variation in temperature of the liquid being metered.

In dispensing liquid such as gasoline, oil and the like, the volume of any particular liquid changes with variations in temperature of the liquid, the degree of change varying with the characteristics of the liquid, such as specific gravity and coefficient of expansion thereof. Unless otherwise provided therefor, a liquid meter, while measuring accurately in terms of volume, will not indicate true value in terms of weight or equivalent at different temperatures. Thus ten gallons measured at 70 degrees Fahrenheit, when cooled down to some reference temperature, say 60 degrees Fahrenheit, for example, will actually be somewhat less than ten gallons. On the other hand, ten gallons measured at a temperature below the reference temperature, will actually be more than ten gallons at the reference temperature. To assure equal value regardless of such changes in volume, it becomes necessary, therefore, to compensate the meter with respect to a reference temperature, so as to always measure a liquid as if it were being dispensed at that temperature.

In addition to changes in volume of liquid caused by changes in temperature, a liquid also undergoes changes in viscosity with changes in temperature, and this is particularly noticeable with petroleum liquids. Due to its viscosity, a liquid has a tendency to form a coating or film on surfaces with which it comes in contact, and accordingly will coat the walls and vanes or blades of meters through which it flows. Furthermore, the viscosity of a particular liquid, like its volume, will vary with changes in temperature.

It will be appreciated therefore, that a film or coating on the components of a meter responsible for metering a liquid as it flows therethrough, will alter the effective volume or capacity of such meter and such change in volume or capacity will vary with changes in viscosity. This is particularly appreciated in a meter of the turbine type which involves a substantial number of blades. A variation in thickness of the film on such blades can appreciably alter the volume of liquid flowing through, per revolution of the rotor. If the meter registers in response to the revolutions of the rotor, an error will thus be created, in addition to that introduced by changes in volume of the liquid, both tracing their origin to changes in temperature.

Such errors are proportional to the changes in temperature which produce them, and though they tend to compensate one another, they do not neutralize each other. Therefore, to assure accurate readings of a meter in term of delivery at a reference temperature of say 60 degrees Fahrenheit, the foregoing factors must be taken into consideration, and if the meter is to measure liquids of different coefficients of expansion and different viscosity characteristics, these factors must also be taken into consideration.

Among the objects of my invention are:

(1) To provide a novel and improved liquid meter;

(2) To provide a novel and improved means in a liquid meter for compensating for variation in volume or density due to expansion or contraction of the liquid caused by temperature changes, the terms volume and density being used interchangeably;

(3) To provide a novel and improved means in a liquid meter for compensating for inaccuracy that may be caused by change in viscosity of the liquid due to temperature change of the liquid;

(4) To provide a novel and improved liquid meter which is adapted to compensate simultaneously for changes both in volume or density, and viscosity of the liquid to be metered;

(5) To provide a novel and improved liquid meter which may be adjusted to meter liquids of different coefficients of expansion and different viscosity characteristics, as well as to compensate for changes in volume or density and viscosity of a particular liquid with changes in temperature.

Additional objects of my invention will be brought out in the following description of a preferred embodiment of the same, taken in conjunction with the accompanying drawings wherein:

Fig. 1 is a fragmentary view in section through a meter embodying the features of the present invention;

Fig. 2 is a view in plan of the structure of Fig. 1;

Figure 3:
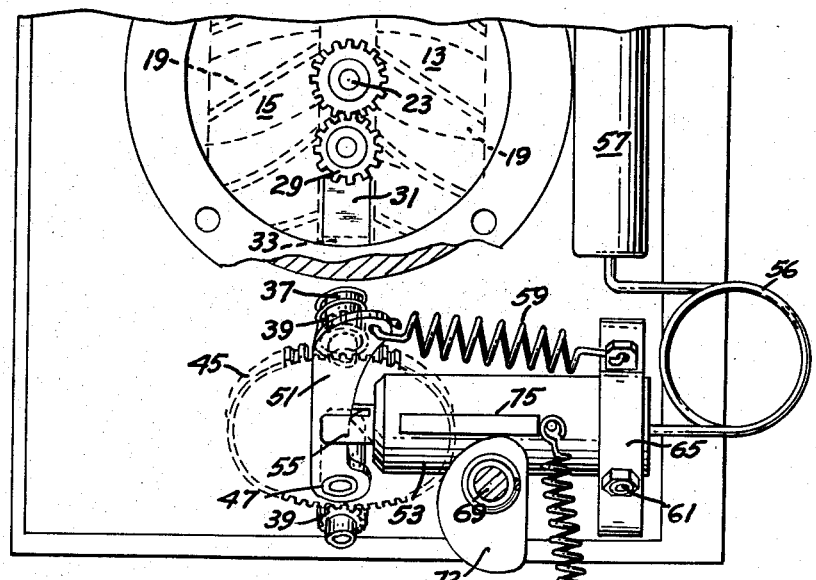
Fig. 3 is a plan view similar to that of Fig. 1, but rotated 90 degrees and with the cover removed to disclose the details of control mechanism involved.
Figure 4:
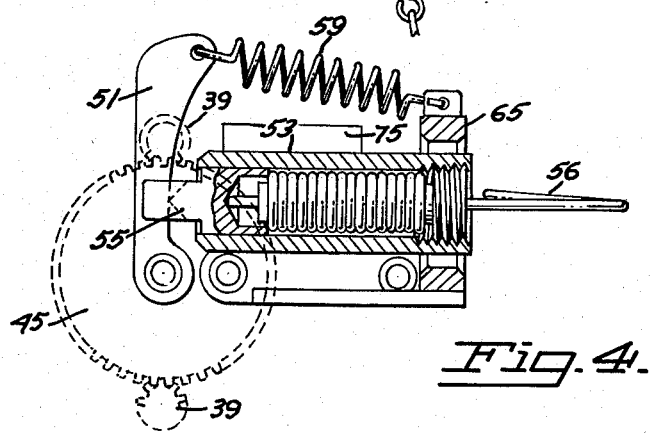
Fig. 4 is a view in section through the control mechanism of Fig. 3.

Referring to the drawings for details of my invention in its preferred form, the same has been shown as embodied in a meter of the turbine type comprising a casing 1 having a cover 3 provided with a center counter bored opening 5 defined by a depending flange 7 from which to support a rotor housing 9, within which is mounted a rotor assembly 11. The construction of such rotor assembly may be along the lines illustrated and described in my patent for Liquid Meter Assembly, No. 2,800,022, of July 23, 1957, and in general involves a pair of rotors 13, 15 supported in alignment on a common shaft 17, with the blades 19 of one rotor reversed with respect to those of the other rotor and with both rotors driving a common shaft 23 extending upwardly through a gland 25 provided in a closure 27 supported within the counter bored end of the central opening of the cover. This shaft 23 is coupled through suitable gearing 29 to a counter or recorder which will be mounted on the cover of the meter, but which is not illustrated in the drawings.

In the space between the two rotors, I provide one or more vanes 31, 33 . . . etc., preferably two in number, each having a stem 35 passing through and journalled in the rotor housing 9, a suitable bushing 37 being provided for this purpose. On the end of each of said stems is mounted a pinion 39. Simultaneously meshing with both pinions, is a gear 45 which is provided with an axial sleeve shaft 47 for rotatably mounting said gear on a post 49 which is anchored to the rotor housing and extends upwardly therefrom. To the end of this sleeve is mounted a lever 51 through actuation of which, rotational adjustment of the vanes 31, 33 within the meter may be accomplished.

Such adjustments, in accordance with the present invention, are made in response to changes in temperature of the liquid flowing through the meter, and is accomplished through temperature responsive means including a Sylphon bellows 53 secured at one end to the rotor housing and having a temperature response element 55 extending from its opposite end into contact with the lever 51 at a selected intermediate point thereof, which will produce the proper compensating adjustment of the vanes with expansion and contraction of the bellows. The temperature response element is preferably bifurcated to straddle the lever, the intermediate portion being tapered to provide for a well defined line contact against the edge of said lever.

The Sylphon bellows is coupled by a connecting tube 56 to a sensing unit 57 which is preferably located within the casing, in the flow path of the liquid through the meter. The sensing unit 57, Sylphon bellows 53 and connecting tube 56 being filled with a temperature sensitive liquid, any change in temperature of liquid being metered, will bring about the proper compensating adjustments of the vanes within the meter, through the resulting response of the Sylphon bellows against the lever.

To assure a maintained contact between the temperature response element 55 of the Sylphon bellows and the lever 51 at all times, means is provided for constantly urging said lever into such contact with the temperature response element of the Sylphon bellows, such means being preferably in the form of a tensioned spring 59 anchored at one end in the free end of the lever 51 and at its other end to some fixed point of the meter in proximity to the mounted end of the Sylphon bellows.

Inasmuch as the errors due to changes in viscosity with temperature oppose those errors due to change in volume with temperature, the adjustment of the vanes within the meter may be such as to compensate only for the difference between the two errors, and this is determined by the proper selection of a point on the lever to be engaged by the Sylphon bellows for the particular liquid to be measured by the meter.

If the meter is to be utilized in measuring liquids of different coefficients of expansion and different viscosity characteristics, further adjustments must be incorporated in the meter to provide for accuracy in measuring flow of such liquids. This, I find, can be accomplished by shifting the point of contact between the Sylphon bellows and the lever so as to alter the lever arm through which the Sylphon bellows functions in effecting rotational adjustments of the vanes within the meter.

To permit of such adjustments of the Sylphon bellows, the anchored end of the Sylphon bellows is mounted between a pair of pivots 61, 63 supported in the opposite side members of a frame 65, such mounting permitting a pivotal motion parallel or in line with the lever 51. The pivots 61, 63 thus establish a pivotal axis for the bellows, which axis is normal to the line of action of the lever 51. In conjunction with this, I provide a control knob 67 having a shaft 69 passing downwardly through a bushing 71 in the cover of the meter, and at its lower end carrying a cam 73 adapted to bear against the Sylphon bellows in a direction exerting a component of force normal to the pivot axis. Preferably, I prefer to provide the Sylphon bellows with a longitudinal rib 75 for engagement by the cam. To maintain such engagement at all times, a tensioned spring 77 anchored at one end to the Sylphon bellows and at its other end to a fixed point on the meter will serve this purpose.

With this adjustment incorporated into the meter, the meter may be calibrated for a range of different liquids, and the exposed surface 79 of the bushing around the control knob may then be provided with a scale indicative of such calibrations.

In operation, an increase in temperature of the liquid flowing through the meter will cause the liquid in the bellows assembly to expand and cause a corresponding expansion of the bellows. Such expansion of the bellows acting against the lever 51 will bring about a slight angular rotation of the gear 45 resulting in a greater angular movement of the pinions 39 in mesh with the gear. As a result, the vanes 31 and 33 would be rotated through a corresponding angle to decrease the angle of approach to the rotor blades, of the liquid flowing through the meter. This in turn will decrease the rotational speed of the rotor and produce a reading lower than would be the case without the change in the angle of approach.

If the meter were compensated only for the effect of temperature change in the weight or volume of liquid and without regard to the effect of such temperature change on viscosity, the increase in the approach angle to the rotor blades would only be such as to make up for the change in weight or volume due to the change in temperature.

However, when one takes into consideration, the change in viscosity occurring with change in temperature, the change in the angle of approach need not be as great.

Thus for example, if within the temperature range from 60 degrees Fahrenheit to 110 degrees Fahrenheit, an uncompensated meter loses 20 gallons out of every 1000 recorded, that is in terms of weight or volume at 60 degrees Fahrenheit, that same meter might conceivably add 10 gallons due to the decrease in viscosity in the liquid at the higher temperature, thus resulting in a net loss of only 10 gallons per thousand.

Thus in compensating such meter only for change in weight or volume of liquid with temperature, the maximum angle of approach of the liquid to the rotor blades would be such as to make up for the calculated 20 gallon loss due to change in weight or volume of the liquid flowing through the meter at the high temperature.

When the effect of change in viscosity is also taken into consideration and the meter is compensated for both change in weight or volume and viscosity, then the maximum angle of approach would be less than if the meter were compensated only for change in weight or volume. When thus compensated for both weight or volume and viscosity, the meter will record with increased accuracy.

It will be apparent from the foregoing that my invention is subject to alteration and modification without departing from the underlying principles involved, and while I have disclosed the same in its preferred form and in considerable detail, I do not desire to be limited in my protection to the specific embodiment so illustrated and described, except as may be necessitated by the appended claims.

I claim:

1. A temperature compensated liquid meter comprising a rotor housing; a rotor in said housing in the flow path of liquid through said housing, said rotor having a plurality of blades; and means for altering the angle of approach of liquid flow to the blades of said rotor in accordance with the difference in response of said meter to changes in volume and viscosity with changes in temperature, said means including a vane in said flow path to said blades with said vane having a stem passing through and journalled in said rotor housing, means for adjusting the angular relationship of said vane to said rotor blades, said last means comprising a pinion on said stem, a gear in meshing engagement with said pinion, said gear having a shaft extending axially therefrom, a lever affixed to said shaft, and temperature responsive means exposed to liquid flow through said meter and engaging said lever at an intermediate point thereof.

2. A temperature compensated liquid meter comprising a rotor housing; a rotor in said housing in the flow path of liquid through said housing, said rotor having a plurality of blades; means for altering the angle of approach of liquid flow to the blades of said rotor in accordance with the difference in response of said meter to changes in volume and viscosity with changes in temperature, said means including a vane in said flow path to said blades with said vane having a stem passing through and journalled in said rotor housing, means for adjusting the angular relationship of said vane to said rotor blades, said last means comprising a pinion on said stem, a gear in meshing engagement with said pinion, said gear having a shaft extending axially therefrom, a lever affixed to said shaft, temperature responsive means exposed to liquid flow through said meter and engaging said lever at an intermediate point thereof; and means for adjusting said meter to measure liquids of different viscosities.

3. A temperature compensated liquid meter comprising a rotor housing; a rotor in said housing in the flow path of liquid through said housing, said rotor having a plurality of blades; means for altering the angle of approach of liquid flow to the blades of said rotor in accordance with the difference in response of said meter to changes in volume and viscosity with changes in temperature, said means including a vane in said flow path to said blades with said vane having a stem passing through and journalled in said rotor housing, means for adjusting the angular relationship of said vane to said rotor blades, said last means comprising a pinion on said stem, a gear in meshing engagement with said pinion, said gear having a shaft extending axially therefrom, a lever affixed to said shaft, temperature responsive means exposed to liquid flow through said meter and engaging said lever at an intermediate point thereof, said temperature responsive means including a Sylphon bellows secured at one end to said meter and having a temperature response element in contact with said lever at an intermediate point thereon, a sensing unit in the flow path of liquid through said meter, and a flow connection between said sensing unit and said Sylphon bellows, and means for maintaining contact between said Sylphon bellows temperature response element and said lever, said contact maintaining means including a spring connected at one end to said lever and anchored under tension at its other end to a fixed point in said meter; and means for adjusting said meter to measure liquids of different viscosities.

4. A temperature compensated liquid meter comprising a rotor housing; a rotor in said housing in the flow path of liquid through said housing, said rotor having a plurality of blades; means for altering the angle of approach of liquid flow to the blades of said rotor in accordance with the difference in response of said meter to changes in volume and viscosity with changes in temperature, said means including a vane in said flow path to said blades with said vane having a stem passing through and journalled in said rotor housing, means for adjusting the angular relationship of said vane to said rotor blades, said last means comprising a pinion on said stem, a gear in meshing engagement with said pinion, said gear having a shaft extending axially therefrom, a lever affixed at one end to said shaft, temperature responsive means exposed to liquid flow through said meter and engaging said lever at an intermediate point thereof, said temperature responsive means including a Sylphon bellows pivotally secured at one end to said meter and having a temperature response element in contact with said lever at an intermediate point thereon, a sensing unit in the flow path of liquid through said meter, and a flow connection between said sensing unit and said Sylphon bellows, and means for maintaining contact between said Sylphon bellows temperature response element and said lever, said contact maintaining means including a spring connected at one end to said lever and anchored under tension at its other end to a fixed point in said meter; and means for adjusting said meter to measure liquids of different viscosities, said means including a control knob mounted on said meter and having a stem approaching said Sylphon bellows, and a cam mounted on said stem in contact with said Sylphon bellows and adapted when angularly adjusted, to swing said Sylphon bellows about its pivot axis and cause its temperature response element to shift its position along said lever, and spring means holding said Sylphon bellows in contact with said cam.

References Cited in the file of this patent
UNITED STATES PATENTS

| 1,015,552 | Gamon | Jan. 23, 1912 |
| 1,185,734 | Trood | June 6, 1916 |
| 1,804,036 | Stevenson | May 5, 1931 |
| 2,222,551 | Ziebolz et al. | Nov. 19, 1940 |
| 2,767,582 | Bartelink | Oct. 23, 1956 |
| 2,896,084 | MacDonald | July 21, 1959 |

FOREIGN PATENTS

| 453,752 | Great Britain | Sept. 17, 1936 |
| 503,748 | Great Britain | Apr. 13, 1939 |
| 744,852 | Great Britain | Feb. 15, 1956 |